(12) United States Patent
Chung et al.

(10) Patent No.: US 12,013,918 B2
(45) Date of Patent: Jun. 18, 2024

(54) METHOD AND APPARATUS FOR CLUSTERING IMAGES

(71) Applicant: SAMSUNG SDS CO., LTD., Seoul (KR)

(72) Inventors: Joo Yeon Chung, Seoul (KR); Min Sik Chu, Seoul (KR); Seong Mi Park, Seoul (KR); Kyong Hee Joo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 394 days.

(21) Appl. No.: 17/476,667

(22) Filed: Sep. 16, 2021

(65) Prior Publication Data

US 2022/0253641 A1     Aug. 11, 2022

(30) Foreign Application Priority Data

Feb. 9, 2021   (KR) ........................ 10-2021-0018051

(51) Int. Cl.
*G06F 18/2413*  (2023.01)
*G06T 7/00*     (2017.01)
*G06V 10/32*    (2022.01)
*G06V 10/40*    (2022.01)

(52) U.S. Cl.
CPC .......... *G06F 18/2413* (2023.01); *G06T 7/001* (2013.01); *G06V 10/32* (2022.01); *G06V 10/40* (2022.01); *G06T 2207/30148* (2013.01)

(58) Field of Classification Search
CPC .... G06F 18/2413; G06V 10/32; G06V 10/40; G06T 7/001; G06T 2207/30148
See application file for complete search history.

(56) References Cited

U.S. PATENT DOCUMENTS

| | | | |
|---|---|---|---|
| 10,831,976 B1* | 11/2020 | Sha | G06N 20/00 |
| 2018/0150962 A1* | 5/2018 | Fletcher | G06T 7/35 |
| 2020/0097850 A1 | 3/2020 | Bae et al. | |

FOREIGN PATENT DOCUMENTS

| | | | | |
|---|---|---|---|---|
| CN | 101210800 B | * | 12/2011 | ........... G01B 11/026 |
| CN | 108280477 A | * | 7/2018 | ......... G06K 9/00221 |
| CN | 111612765 A | * | 9/2020 | ............. G06T 5/002 |
| CN | 112749645 A | * | 5/2021 | ......... G06K 9/00362 |
| JP | 2012-084117 A | | 4/2012 | |
| JP | 2016-191966 A | | 11/2016 | |
| KR | 10-2019-0081710 A | | 7/2019 | |
| KR | 10-2008973 B1 | | 8/2019 | |
| KR | 10-2020-0057291 A | | 5/2020 | |
| KR | 10-2146943 B1 | | 8/2020 | |
| KR | 10-2020-0119370 A | | 10/2020 | |
| KR | 10-2020-0137219 A | | 12/2020 | |
| WO | WO 2019/157435 A1 | | 8/2019 | |

* cited by examiner

*Primary Examiner* — Wednel Cadeau
(74) *Attorney, Agent, or Firm* — Sughrue Mion, PLLC

(57) ABSTRACT

A method performed by a computing device for clustering an image according to an embodiment of the present disclosure includes performing a first clustering on feature vectors of the plurality of images, and performing a second clustering for feature vectors belonging to some clusters that do not satisfy a reference score among clusters formed as a result of the first clustering, wherein a clustering parameter of the second clustering and a clustering parameter of the first clustering are different from each other.

18 Claims, 16 Drawing Sheets

(a)

(b)

(a)

(b)

METHOD AND APPARATUS FOR CLUSTERING IMAGES

This application claims the benefit of Korean Patent Application No. 10-2021-0018051, filed on Feb. 9, 2021, in the Korean Intellectual Property Office, the disclosure of which is incorporated herein by reference in its entirety.

BACKGROUND

1. Field

The present disclosure relates to an image clustering method and apparatus thereof. More specifically, it relates to a method and apparatus for iteratively clustering images according to a clustering parameter optimized based on artificial intelligence learning.

2. Description of the Related Art

In the semiconductor manufacturing process, the photo process is a process of forming a circuit pattern on a wafer using light. Referring to FIG. 6 to describe the photo process in more detail, the exposure apparatus 400 transfers the circuit pattern of the mask onto the wafer 30 coated with the photoresist. Since the above-described photo process is a process that can be reworked, a method of accurately inspecting the circuit pattern formed on the wafer 30 is required to improve the semiconductor yield. For example, the normal circuit pattern 31 may be formed on the wafer, and the abnormal circuit pattern 33 having defects may be formed on the wafer.

The conventional technique of inspecting the circuit pattern formed on the wafer 30 is a method of comparing the circuit pattern image 10, in which the circuit pattern has been photographed, with a standard image, in which the normal circuit pattern has been photographed. However, due to the complexity of the circuit pattern required for the chip, there is a problem in that all points cannot be fully inspected because the number of points to be compared is excessive. In accordance with this problem, in the prior art, the operator individually classifies the circuit pattern image 10 to reduce the point to be compared. In this classification method, since the circuit pattern image 10 is classified by the operator's manual operation, there is a problem that human errors exist and the time required for work is also excessive.

Some semiconductor design software supports the function of clustering the circuit pattern image 10. However, such a clustering function has low clustering performance, so errors such as classifying the same circuit pattern image into different clusters or classifying different circuit pattern images into the same cluster exist, and the required costs are also excessive.

Accordingly, there is a need for an image clustering method with improved clustering performance of the circuit pattern image 10.

SUMMARY

The technical problem to be solved through some embodiments of the present disclosure is to provide an apparatus for classifying images that are difficult to classify with one clustering due to the scale heterogeneity characteristic of a feature space formed by a feature vector extracted from a plurality of images, and a method performed in the apparatus.

Another technical problem to be solved through some embodiments of the present disclosure is to provide an apparatus for clustering circuit pattern images in order to detect defects in circuit patterns formed on a wafer and a method performed in the apparatus.

Another technical problem to be solved through some embodiments of the present disclosure is to provide an apparatus for automatically clustering circuit pattern images in order to improve the classification speed for circuit pattern images and a method performed in the apparatus.

Another technical problem to be solved through some embodiments of the present disclosure is to provide an apparatus for clustering circuit pattern images in an automated manner in order to objectively guarantee circuit pattern image clustering performance and a method performed in the apparatus.

The technical problems of the present disclosure are not limited to the technical problems mentioned above, and other technical problems that are not mentioned will be clearly understood by those skilled in the art from the following description.

According to a method performed by a computing device for clustering an image comprising, performing a first clustering on a feature vector of each of a plurality of images and performing a second clustering for feature vectors belonging to some clusters that do not satisfy a reference score among clusters formed as a result of the first clustering, wherein a clustering parameter of the second clustering and a clustering parameter of the first clustering are different from each other.

According to an embodiment, wherein the plurality of images are circuit pattern images formed on a semiconductor wafer.

According to an embodiment, converting each of the plurality of images into a feature vector, wherein converting into the feature vector comprises, extracting a first direction component of a target image, extracting a second direction component perpendicular to the first direction and converting the target image into a feature vector based on the extracted first direction component and second direction component.

According to an embodiment, repeating clustering while changing the clustering parameter until all clusters formed as a result of clustering satisfy the reference score.

According to an embodiment, performing pre-processing of a target image among the plurality of images and converting the pre-processed target image into a feature vector.

According to an embodiment, wherein performing the pre-processing comprises removing a transparency of the target image.

According to an embodiment, wherein performing the pre-processing comprises adjusting a resolution of the target image.

According to an embodiment, wherein performing the pre-processing comprises converting a color of the target image to black and white.

According to an embodiment, wherein performing the pre-processing comprises extracting an outline of the target image.

According to an embodiment, reducing a dimension of a plurality of feature vectors converted as a result of repeating the step of converting the target image into the feature vector until it is complete for the entire plurality of images.

According to an embodiment, wherein reducing a dimension of the plurality of feature vectors comprises simultaneously reducing a dimension of the plurality of feature vectors.

According to an embodiment, wherein reducing a dimension of the plurality of feature vectors comprises individually reducing a dimension of each of the plurality of feature vectors.

According to an embodiment, wherein the clustering parameter includes a resolution of a clustering target image.

According to an embodiment, wherein the clustering parameter includes a clustering algorithm.

According to an embodiment, wherein the clustering parameter is determined based on a resolution of a clustering target image for optimization of an objective function value, a cluster radius, and a minimum number of vectors for cluster formation.

According to an embodiment, wherein the optimization is performed based on reinforcement learning.

According to an embodiment, wherein the reference score is a value determined based on a density of a cluster.

According to an embodiment, wherein the reference score is a value determined based on an attribute of a feature vector included in a cluster.

According to another aspect of the present disclosure, an apparatus for clustering an image comprising, a processor, a network interface, a memory and a computer program loaded into the memory and executed by the processor, wherein the computer program comprises, an instruction for performing a first clustering on a feature vector of each of a plurality of images and an instruction for performing a second clustering for feature vectors belonging to some clusters that do not satisfy a reference score among clusters formed as a result of the first clustering, wherein a clustering parameter of the second clustering and a clustering parameter of the first clustering are different from each other.

According to another aspect of the present disclosure, a method performed by a computing device for inspecting an abnormal circuit patter comprising, performing clustering on a plurality of images, in which a circuit pattern is photographed, while repeatedly performing clustering based on a changed clustering parameter for an image included in a cluster that does not satisfy a reference score until all clusters formed as a result of preforming clustering satisfy the reference score and detecting a defect in a circuit pattern corresponding to the cluster based on a difference between a sample image included in a cluster formed based on the step of repeatedly performing the clustering and a predetermined standard image.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
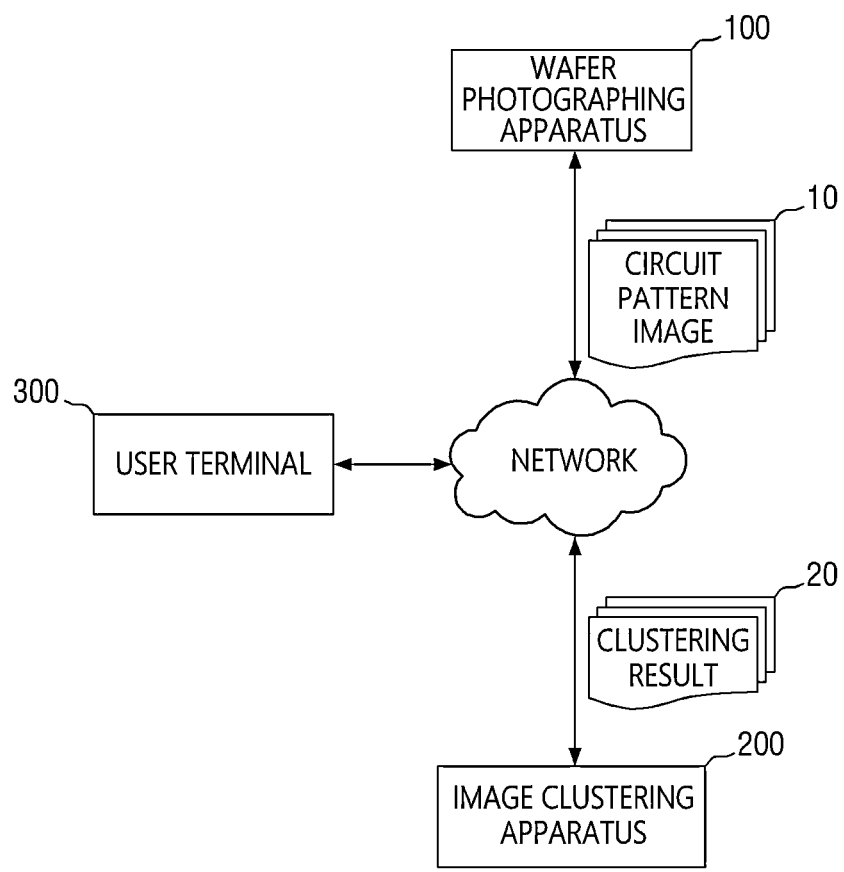
FIG. 1 illustrates an exemplary environment, to which an image clustering apparatus according to an embodiment of the present disclosure can be applied.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present inventive concept, when it is determined that the detailed description of the related well-known configuration or function may obscure the gist of the present inventive concept, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present inventive concept will be described in detail with reference to the accompanying drawings.

FIG. 1 illustrates an exemplary environment, to which the image clustering apparatus 200 according to an embodiment of the present disclosure can be applied. It should be noted that the environment for classifying a plurality of circuit pattern images 10 illustrated in FIG. 1 represents an example, to which the image clustering apparatus 200 can be applied, and does not limit the scope of application of the present disclosure. For a specific example, the image clustering apparatus 200 shown in FIG. 1 may be applied to classify images, on which it is difficult to perform clustering by a single rule, since multidimensional feature vectors are extracted. As another example, in the classification of images, on which it is difficult to perform clustering by applying a single rule once, according to the scale heterogeneity characteristic of a feature space extracted from a plurality of images, the image clustering apparatus 200 illustrated in FIG. 1 may be applied. Here, the scale heterogeneity characteristic means a characteristic, in which vectors extracted from a plurality of images on a feature space are distributed in different forms, on which it is difficult to perform clustering by applying a single rule once.

Hereinafter, an exemplary environment, in which the image clustering apparatus 200 can be applied to classify the circuit pattern image 10 having the above-described image characteristics, will be described in detail with reference to FIG. 1. FIG. 1 only shows a preferred embodiment for achieving the object of the present disclosure, and some components may be added or deleted as necessary. In addition, it should be noted that the components of the exemplary environment illustrated in FIG. 1 represent functional elements that are functionally divided, and a plurality of components may be implemented in a form, in which they are integrated with each other in an actual physical environment. For example, the wafer photographing apparatus 100 and the image clustering apparatus 200 may be implemented in the form of different modules in the same computing device. Hereinafter, the individual components shown in FIG. 1 will be described in more detail.

Figure 7:
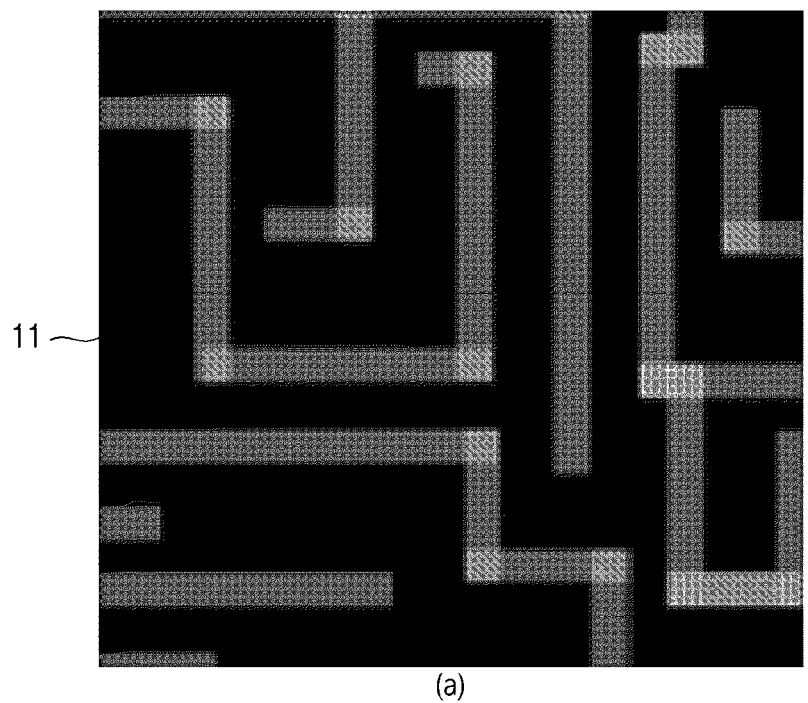
FIG. 7 is an exemplary diagram of an ideal circuit pattern image and an actual circuit pattern image that can be referred to in some embodiments of the present disclosure.
Figure 7:
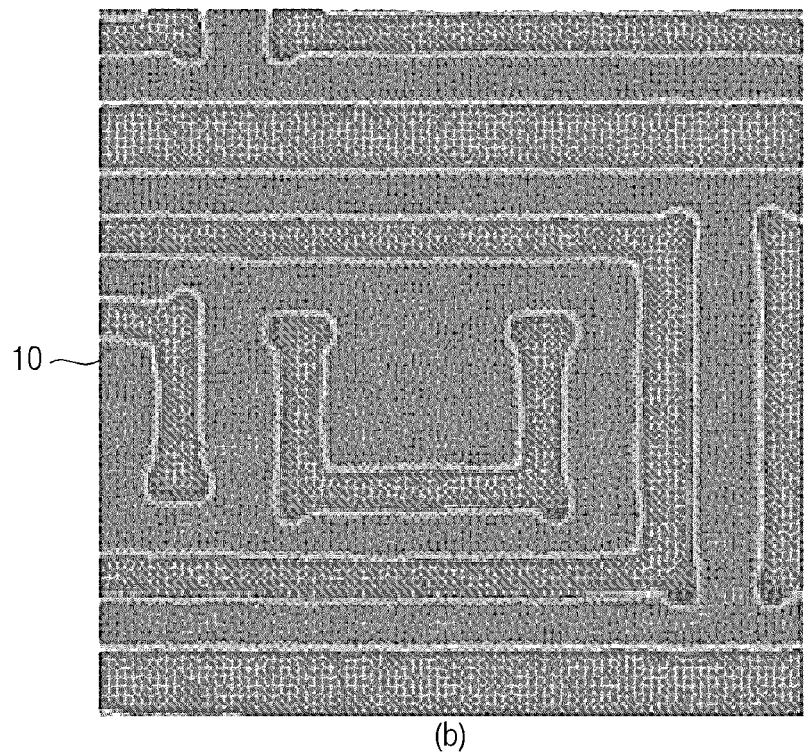
Figure 8:
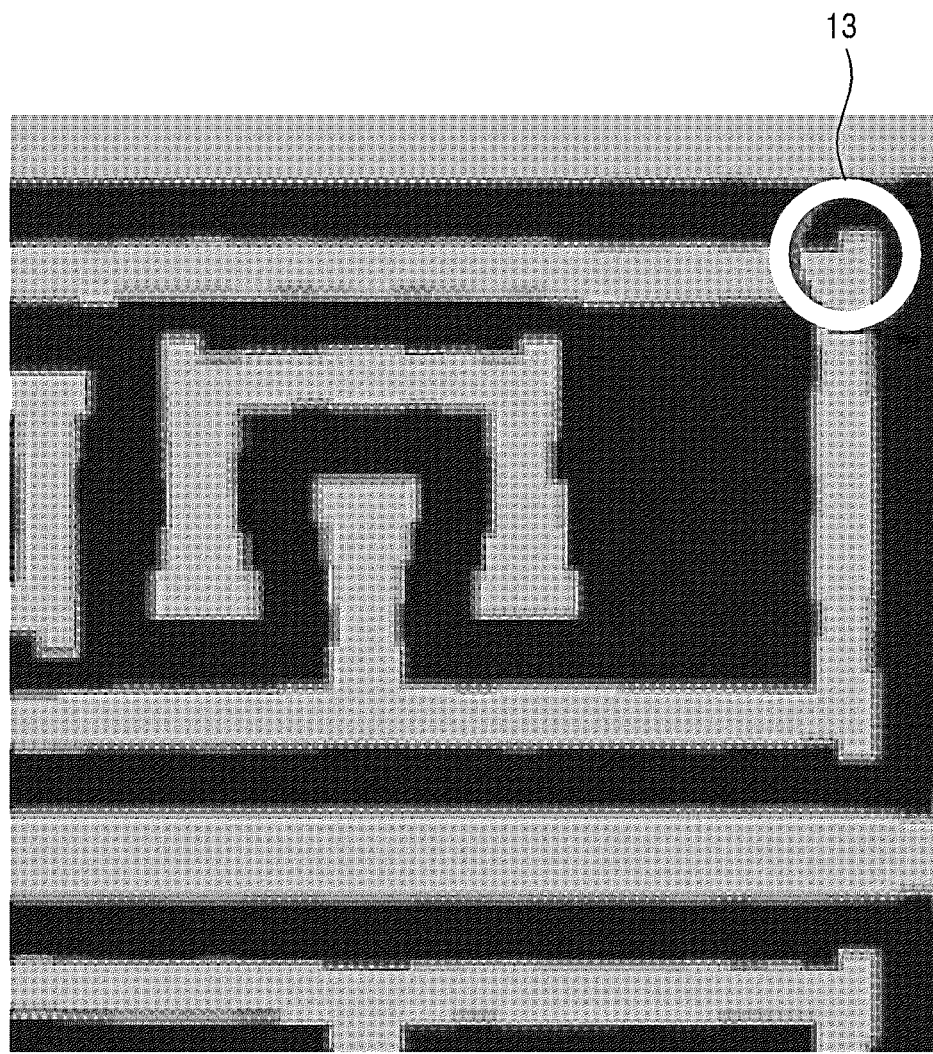
FIG. 8 is an exemplary diagram for describing noise included in an actual circuit pattern image described with reference to FIG. 7.

The wafer photographing apparatus 100 may photograph a circuit pattern formed on a wafer as a result of the photo process. The circuit pattern image 10 generated as a result of photographing will be described in more detail with reference to FIG. 7. (a) of FIG. 7 is an exemplary diagram of an ideal circuit pattern 11 for design, and (b) of FIG. 7 is an exemplary diagram of an actual circuit pattern image 10. The circuit pattern image 10 shown in (b) of FIG. 7 contains noise, unlike the ideal circuit pattern 11 shown in (a) of FIG. 7. For example, the ideal circuit pattern 11 is a linear type, while the circuit pattern included in the circuit pattern image 10 is a curved type. For another example, the edge of the ideal circuit pattern 11 forms a right angle, while the edge of the circuit pattern included in the circuit pattern image 10 does not form a right angle. In particular, the noise 13 formed on the edge of the circuit pattern shown in FIG. 8 is reflected in the feature vector and becomes a factor that makes it difficult to classify images by a conventional clustering method. A method of clustering the actual circuit pattern image 10 will be described in detail through description of the specification later.

Also, the wafer photographing apparatus 100 may transmit the circuit pattern image 10 generated as a result of photographing to the image clustering apparatus 200. FIG. 1 shows that one wafer photographing apparatus 100 is applied, but this is only for convenience of understanding, and the number of wafer photographing apparatuses 100 may vary. That is, the plurality of wafer photographing apparatuses 100 may photograph a circuit pattern formed on a wafer, and transmit a plurality of circuit pattern images 10 generated as a result of photographing to the image clustering apparatus 200.

The wafer photographing apparatus 100 may be any apparatus capable of photographing a circuit pattern formed on a wafer. Here, it should be noted that all known techniques for photographing the circuit pattern formed on the wafer can be applied.

Next, the image clustering apparatus 200 may cluster a plurality of circuit pattern images 10 received from the wafer photographing apparatus 100. In addition, the image clustering apparatus 200 may transmit the clustering result 20 to the user terminal 300. Furthermore, the image clustering apparatus 200 may detect a defect in a circuit pattern based on the clustering result 20.

The image clustering apparatus 200 may be implemented as one or more computing devices. For example, all functions of the image clustering apparatus 200 may be implemented in a single computing device. As another example, a first function of the image clustering apparatus 200 may be implemented in a first computing device, and a second function may be implemented in a second computing device. Here, the computing device may be a notebook, a desktop, a laptop, etc., but is not limited thereto and may include all types of devices equipped with a computing function. However, in an environment, in which the image clustering apparatus 200 receives a plurality of circuit pattern images 10 and provides the clustering result 20, the image clustering apparatus 200 is preferably implemented as a high-performance server-class computing device. An example of the above-described computing device will be described later with reference to FIG. 20.

In order to exclude redundant descriptions of operations performed by the image clustering apparatus 200, a more detailed description of the operations of the image clustering apparatus 200 will be described later with reference to FIGS. 2 to 19.

Next, the user terminal 300 may receive the clustering result 20 transmitted by the image clustering apparatus 200. In addition, the user terminal 300 may display the received clustering result 20 on the screen.

More specifically, the user terminal 300 transmits a request to view the clustering result 20 to the image clustering apparatus 200 according to a user's input. Then, the user terminal 300 receives the clustering result 20 from the image clustering apparatus 200. Then, the user terminal 300 outputs the received clustering result 20 on the screen. The user terminal 300 may have a web browser or a dedicated application installed in order to output the clustering result 20.

Figure 19:
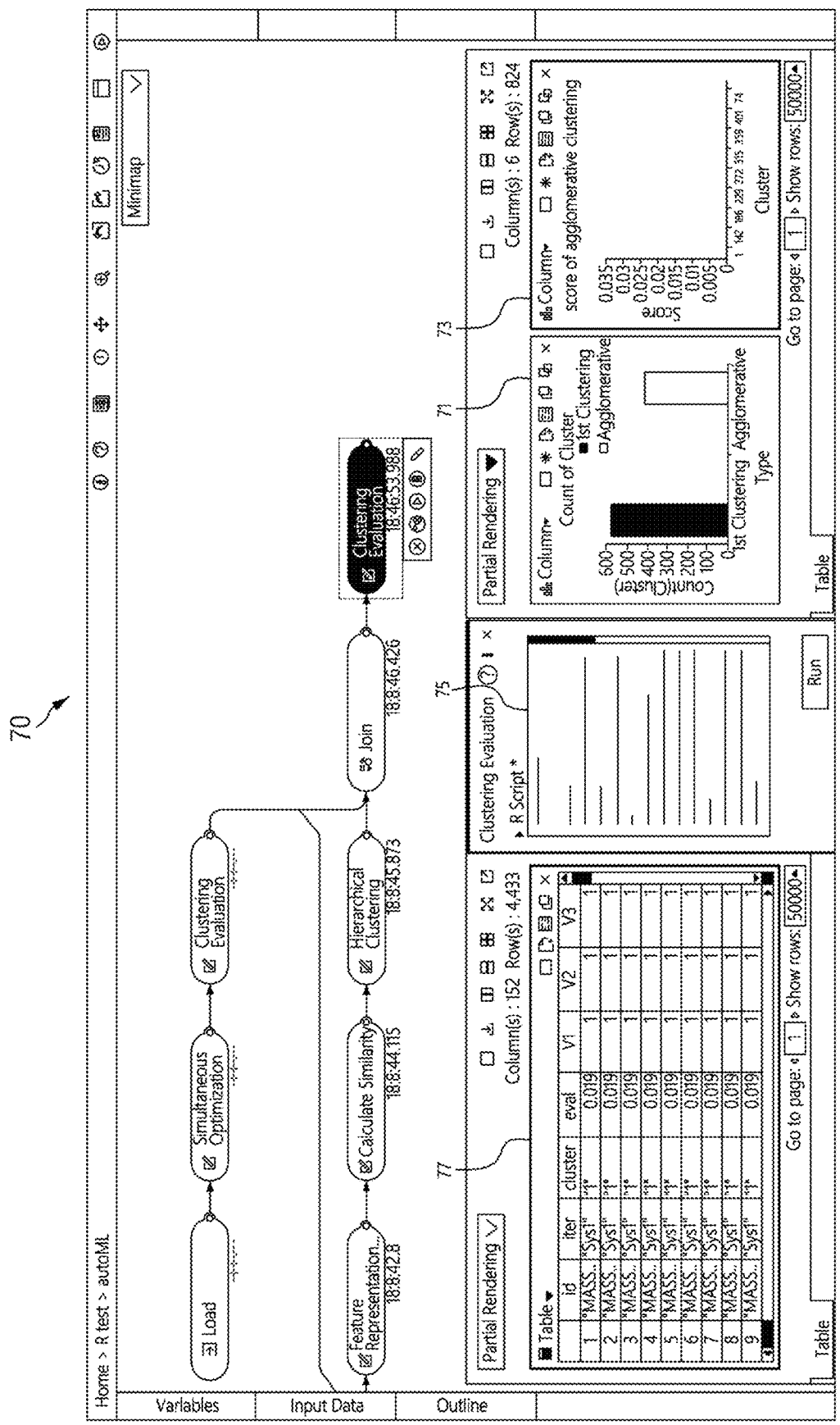
FIG. 19 is an exemplary diagram of a user terminal screen described with reference to FIG. 1.

The user terminal 300 that may be referred to in some embodiments of the present disclosure may be a notebook, a desktop, a laptop, etc., but is not limited thereto, and may include all types of devices equipped with a computing function. FIG. 19, which will be described later, is an example of a screen displayed on the user terminal 300.

Meanwhile, each component illustrated in FIG. 1 may mean software or hardware such as a Field Programmable Gate Array (FPGA) or an Application-Specific Integrated Circuit (ASIC). However, the components are not limited to software or hardware, and may be configured to be in an addressable storage medium, or may be configured to execute one or more processors. Functions provided within the components may be implemented by more subdivided components, or may be implemented as one component that performs a specific function by combining a plurality of components.

So far, an exemplary environment, to which the image clustering apparatus 200 according to an embodiment of the present disclosure can be applied, has been described with reference to FIG. 1. Hereinafter, an image clustering method that can be performed in the image clustering apparatus 200 will be described with reference to FIGS. 2 to 19.

Figure 2:
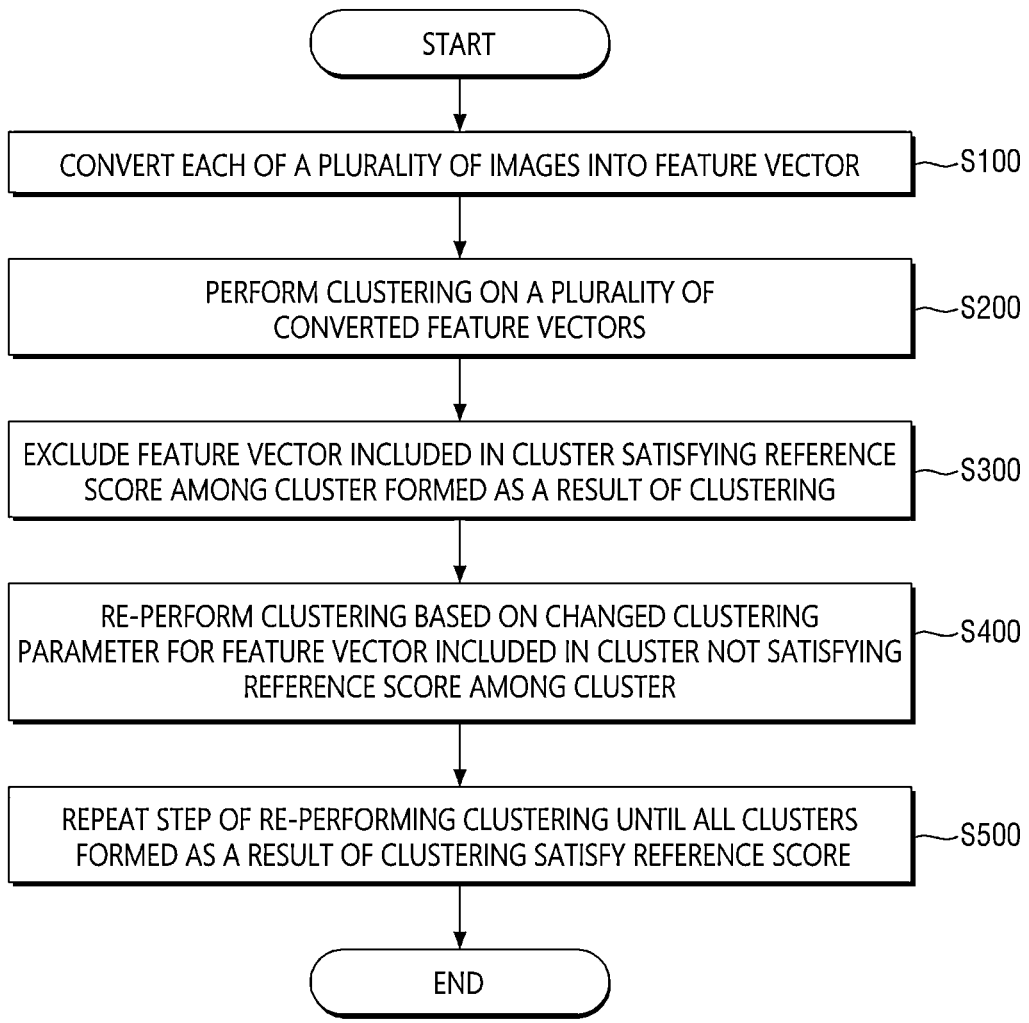
FIG. 2 is an exemplary flowchart illustrating an image clustering method according to another embodiment of the present disclosure.

FIG. 2 is an exemplary flowchart illustrating an image clustering method according to another embodiment of the present disclosure. The flowchart shown in FIG. 2 is only a preferred embodiment for achieving the object of the present disclosure, and some steps may be added or deleted as necessary.

In addition, each step of the methods shown in FIG. 2 may be performed by a computing device. In other words, each step of the methods may be implemented with one or more instructions executed by the processor of the computing device. All steps included in the methods may be performed by one physical computing device, but the first steps of the method may be performed by a first computing device, and the second steps of the method may be performed by a second computing device. Hereinafter, description will be continued on the assumption that each step of the methods is performed by the image clustering apparatus 200 illustrated in FIG. 1. However, for convenience of description, the description of the operation subject of each step included in the methods may be omitted.

Referring to FIG. 2, in step S100, each of a plurality of images is converted into a feature vector. That is, in clustering a plurality of images, each of the plurality of images is converted into a feature vector in order to search for a certain pattern or rule. This is a process of expressing information on an image as a numerical vector so that the computing device can recognize it. For a more detailed description of this, it will be described with reference to FIG. 3.

Figure 3:
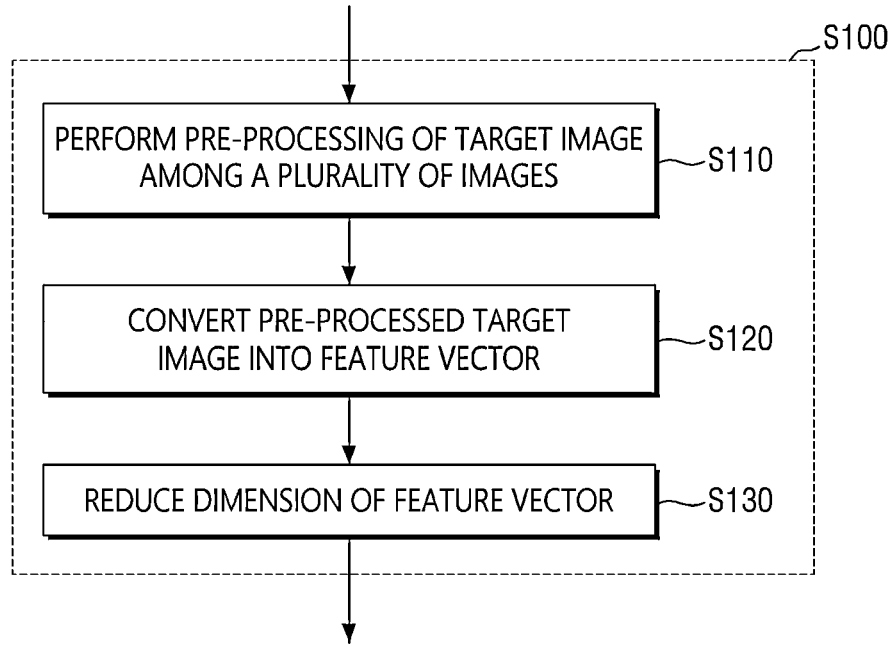
FIG. 3 is an exemplary flowchart for describing in more detail the detailed operation of step S100 described with reference to FIG. 2.

FIG. 3 is an exemplary flowchart for describing in more detail the detailed operation of step S100 described with reference to FIG. 2.

Referring to FIG. 3, in step S110, pre-processing of a target image among a plurality of images is performed. Here, the target image refers to an image to be pre-processed among a plurality of images. In order to extract the feature vector from the target image, all operations of processing the target image into an appropriate form may be included in the pre-processing operation. Hereinafter, exemplary operations that may be included in the pre-processing operation will be described.

Figure 10:
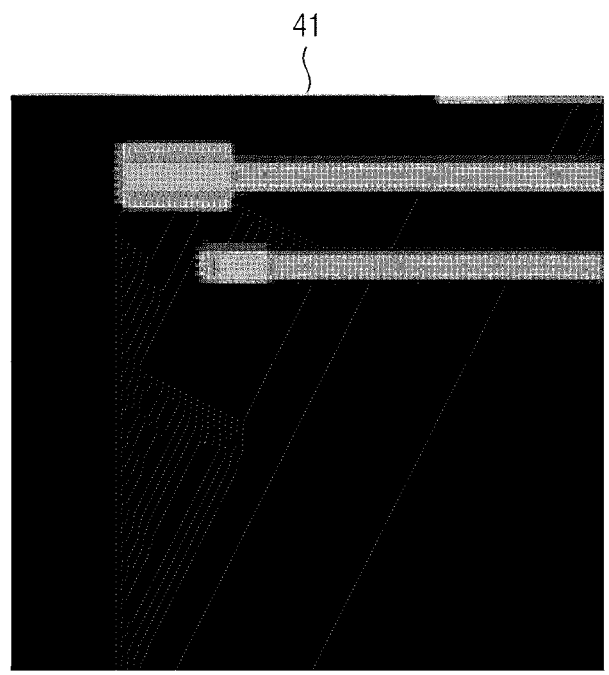
FIGS. 10 to 13 are exemplary diagrams for describing in more detail step S110 described with reference to FIG. 3.

In some embodiments related to step S110, the transparency of the target image may be removed. For example, the Alpha value of the RGBA color of the target image can be removed. According to this embodiment, an image may be processed in a form for extracting a feature vector. Referring to FIG. 10, an example of the above-described target image 41, from which the transparency has been removed, can be seen.

In some other embodiments related to step S110, the resolution of the target image may be adjusted. For example, the resolution can be adjusted to any one of 32 dpi, 64 dpi, 128 dpi, and 512 dpi. However, it should be noted that the above-described example is for specifically describing the adjustment of the resolution, and does not limit the scope of the present disclosure.

Figure 11:
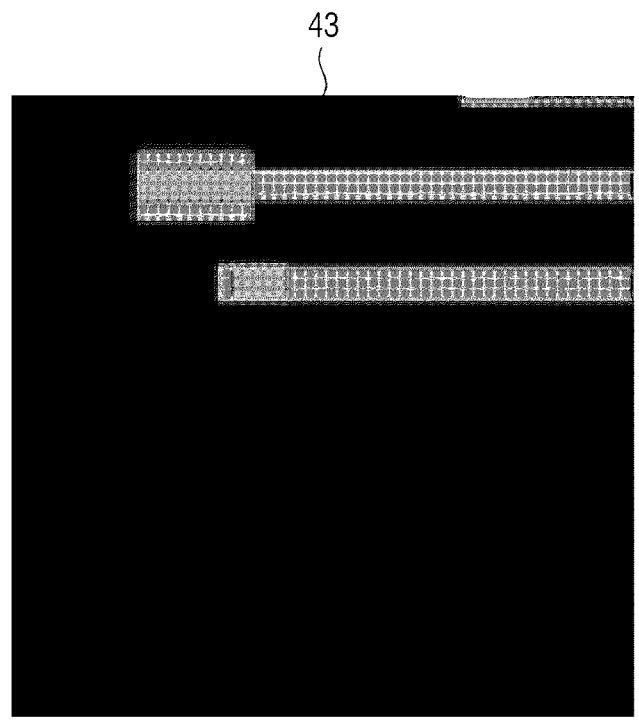
Figure 11:
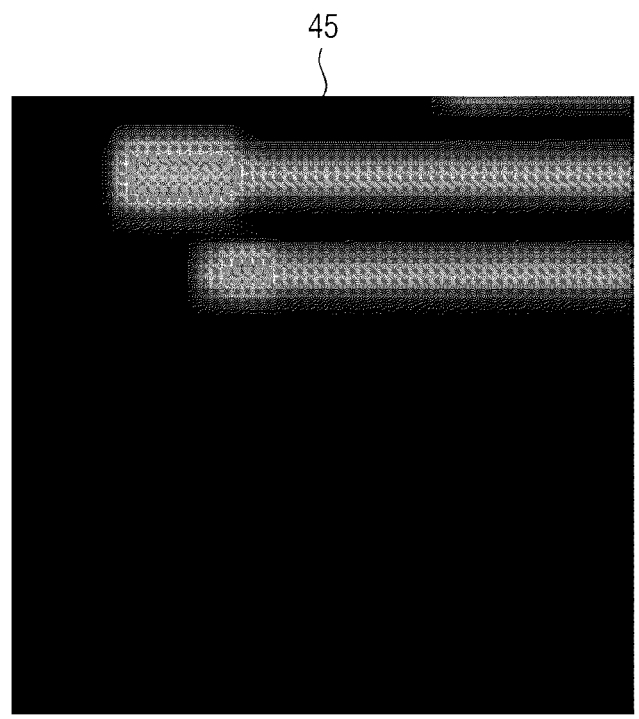

Referring to FIG. 11, examples of the above-described target images, for which the resolution has been adjusted, can be seen. (a) of FIG. 11 is a target image 43 adjusted to a high resolution, and (b) of FIG. 11 is a target image 45 adjusted to a low resolution. When a plurality of images to be pre-processed are adjusted to a low resolution, the clustering time may be shortened. Also, a clustering error due to noise described with reference to FIG. 8 may be prevented. That is, since the target image is adjusted to a low resolution, noise included in the target image can be ignored when extracting the feature vector. However, there is a problem in that it is difficult to extract a feature vector that accurately reflects the features of the target image when a plurality of images to be pre-processed are adjusted to only a low resolution. Therefore, the determination of the resolution of the target image is an important problem in image clustering. In some embodiments, the resolution of the target image may be adjusted to a predetermined fixed value. In some other embodiments, the resolution of the target image is determined by reinforcement learning for each step of clustering to be specified from the description of the specification later, so that clustering for each step may be performed.

Figure 12:
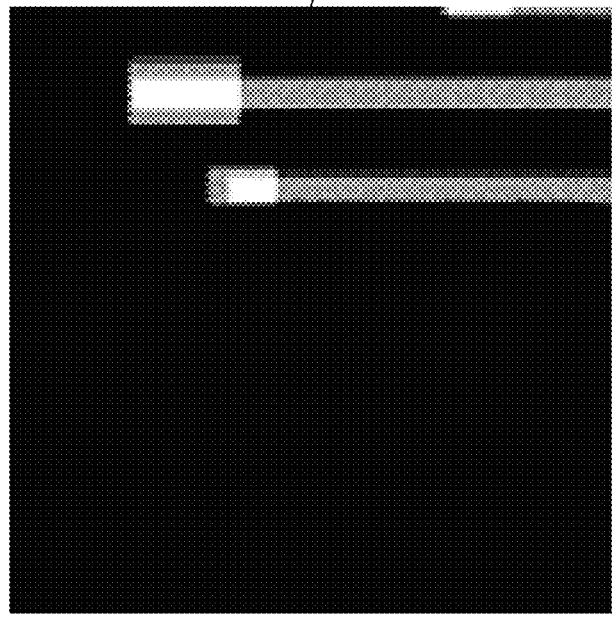

In still other embodiments related to step S110, the color of the target image may be converted to black and white. For example, the RGB color of the target image may be changed to grayscale. All known methods of changing RGB color to grayscale can be applied to this embodiment. According to the present embodiment, RGB colors may be converted to grayscale for a target image that does not require RGB color data during clustering. Referring to FIG. 12, an example of the above-described target image 47 converted to black and white can be seen.

Figure 13:
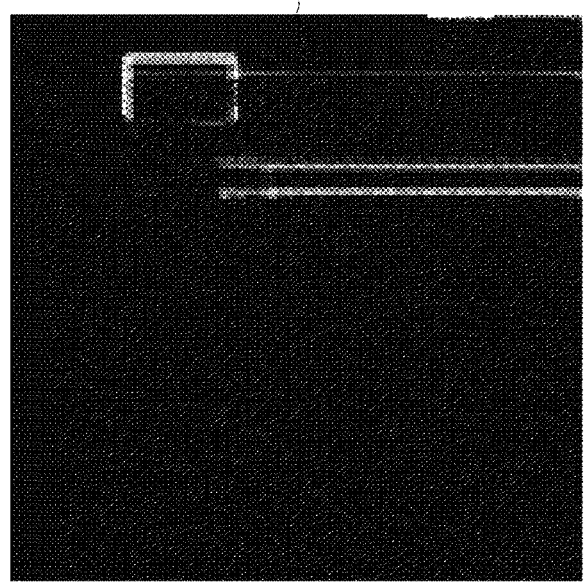

In still other embodiments related to step S110, the outline of the target image may be extracted. All known methods of extracting the outline of an image can be applied to this embodiment. For example, a method of extracting an outline of an image based on a differential value of the image contrast may be applied to the present embodiment. According to the present embodiment, during clustering, the outline may be extracted for a target image where the outline of the image is important. Referring to FIG. 13, an example of the above-described target image 49, from which the outline has been extracted, can be seen.

It will be described again with reference to FIG. 3.

Next, in step S120, the pre-processed target image is converted into a feature vector. As described above, a process of expressing information on the pre-processed target image as a numerical vector so that the computing device can recognize it is performed. For a detailed description related to step S120, it will be described with reference to FIG. 4.

Figure 4:
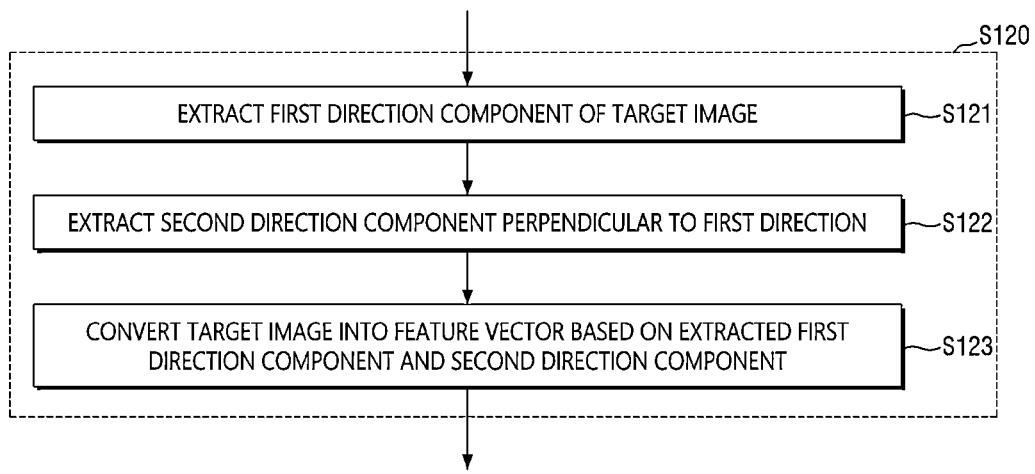
FIG. 4 is an exemplary flowchart for describing in more detail the detailed operation of step S120 described with reference to FIG. 3.

FIG. 4 is an exemplary flowchart for describing in more detail the detailed operation of step S120 described with reference to FIG. 3.

Referring to FIG. 4, in step S121, a first direction component of the target image is extracted. All known methods for extracting the first direction component of an image can be applied to this embodiment. For example, the first direction component may be extracted based on the differential value of the image contrast in the first direction.

In some embodiments related to step S121, a direction, in which the variance of the differential value of the image contrast is largest, may be determined as the first direction. Since the direction, in which the variance of the differential value is largest, will include the most feature information of the image, it may be reasonable that the direction, in which the variance of the differential value is largest, is determined as the first direction.

Next, in step S122, a second direction component perpendicular to the first direction is extracted. In the present embodiment, the second direction is perpendicular to the first direction. In order to extract features of an image, in which the pattern is orthogonal, such as a circuit pattern image, it is preferable to determine the second direction so as to be perpendicular to the first direction.

In some embodiments related to step S122, a direction, in which the variance of the differential value of the image contrast is the second largest, may be determined as the second direction. Since the direction, in which the variance of the differential value is the second largest, will include the second most feature information of the image, it may be reasonable to determine the direction, in which the variance of the differential value is the second largest, as the second direction.

Next, based on the first direction component and the second direction component extracted in step S123, the target image is converted into a feature vector. For example, based on a linear combination of a first direction component and a second direction component of the target image, the target image may be converted into a feature vector. In order to describe the determination of the first direction and the second direction described with reference to FIG. 4 in more detail, it will be described with reference to FIG. 14.

Figure 14:
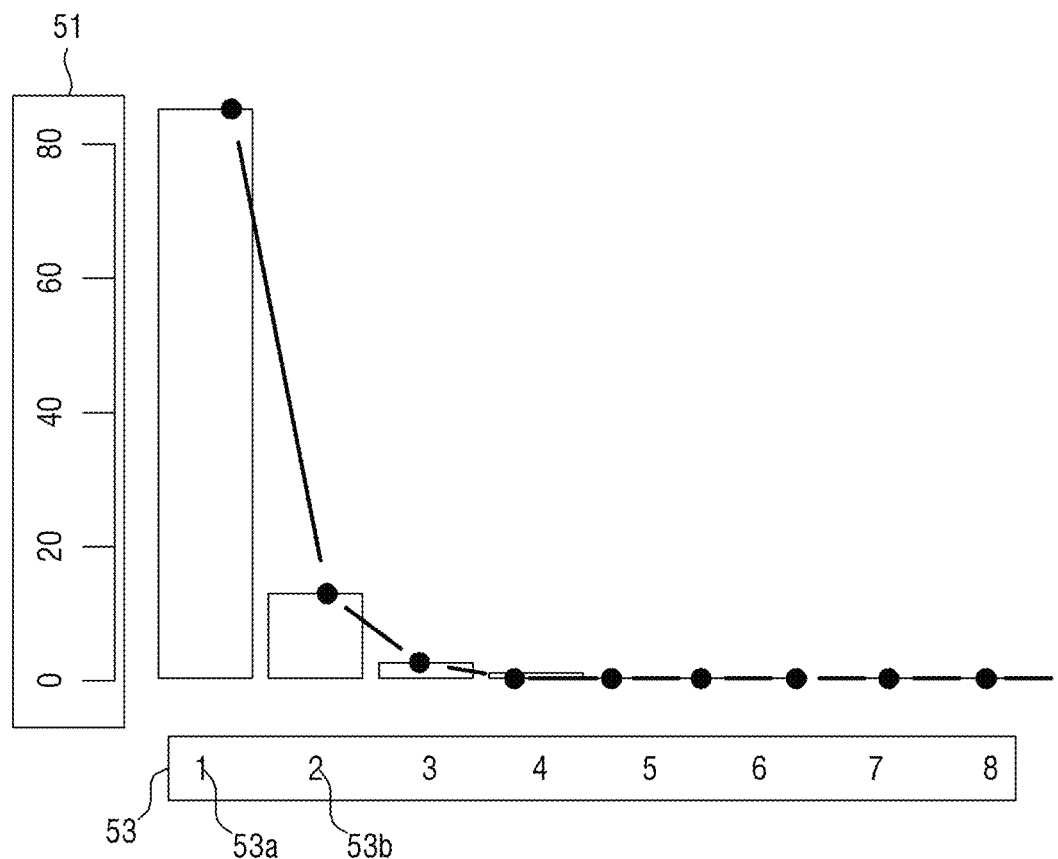
FIG. 14 is an exemplary diagram for describing in more detail step S120 described with reference to FIG. 3.

FIG. 14 is a graph showing an example of variance values of components for an arbitrary direction of a target image. The x-axis 53 of the graph shown in FIG. 14 represents an arbitrary direction of the target image, and the y-axis 51 represents the variance value of the components for the corresponding direction. As described above, the direction having the largest variance value may be determined as the first direction 53a, and the direction having the second largest variance value may be determined as the second direction 53b. In this case, the first direction and the second direction may be perpendicular to each other.

It will be described again with reference to FIG. 3.

Next, in step S130, the dimension of the feature vector is reduced. The feature vector converted from the above-described target image may include a plurality of first direction components and a plurality of second direction components. Accordingly, the feature vector corresponding to the target image may be a multidimensional vector. In this embodiment, the dimension of the feature vector may be reduced in order to reduce the amount of computation of the computing device. All known methods for reducing the dimension of the feature vector can be applied to this embodiment. For example, the dimension of the feature vector may be reduced by a principal component analysis (PCA) algorithm.

In some embodiments related to step S130, as a result of repeatedly performing the step of converting a target image into a feature vector until it is completed for the entire plurality of images, the dimensions of the plurality of converted feature vectors may be reduced.

For example, the dimensions of a plurality of feature vectors may be simultaneously reduced. In this case, the temporal cost for reducing the dimensions of the plurality of feature vectors may be reduced. For another example, the dimensions of each of the plurality of feature vectors may be individually reduced. In this case, in clustering of complex images, higher clustering performance can be obtained than the above-described method of simultaneously reducing the dimensions of a plurality of feature vectors.

Here, the clustering performance may mean a value indicating a degree of accurately classifying an image. For example, if the cluster error rate indicating a ratio of images of a pattern different from other images among images included in a specific cluster is low, it may mean that the clustering performance is good. In addition, the clustering performance may mean a value representing the reduction rate of the cluster, in which the image is finally classified. For example, if the number of finally classified clusters is small and the reduction rate is high, it may mean that the clustering performance is good. Also, the clustering performance may be a value, in which the above-described error rate and reduction rate are considered at the same time. For example, if the reduction rate is in the reference range and the error rate is low, it may mean that the clustering performance is good.

Figure 9:
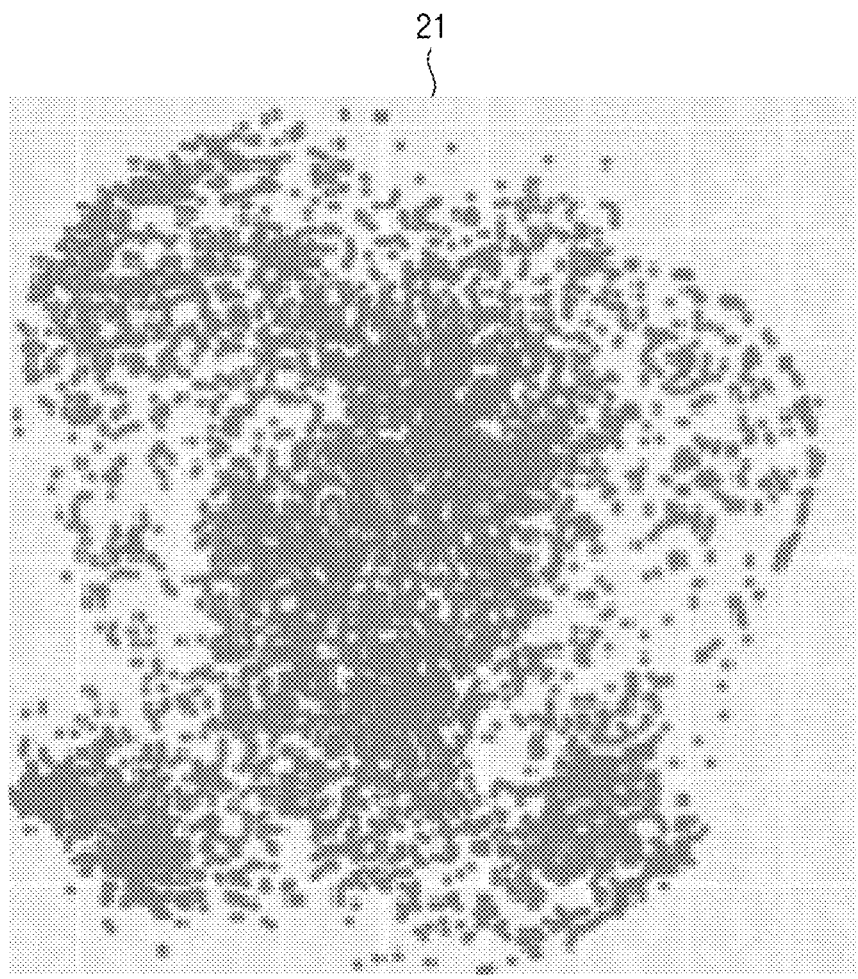
FIG. 9 is an exemplary diagram for describing a feature space extracted from a plurality of circuit pattern images that can be referred to in some embodiments of the present disclosure.

FIG. 9 is an example, in which feature vectors extracted from a plurality of images are shown in the feature space 21 according to the steps described with reference to FIG. 3. For example, when a feature vector extracted from a circuit pattern image is shown in the feature space 21, scale heterogeneity characteristics as in the example shown in FIG. 9 may be exhibited. there is a case where it is difficult to classify images by one clustering according to these scale heterogeneity characteristics. However, in spite of scale heterogeneity characteristics, images can be classified with high clustering performance by repeatedly clustering while changing a clustering parameter to be specified through the description of the specification later.

Hereinafter, a more detailed description of the clustering steps will be described with reference to FIG. 2 again.

In step S200, clustering is performed on a plurality of converted feature vectors. At this time, the algorithms that can be applied to the clustering may be any one of Self-Organizing Map, K-average algorithm, Mean-Shift algorithm, Density-Based Spatial Clustering of Applications with Noise (DBSCAN) algorithm, and Agglomerative Hierarchical Clustering algorithm. In addition, it should be noted that all known clustering algorithms in addition to the above-described algorithms can be applied.

Next, in step S300, a feature vector included in a cluster satisfying the reference score among the clusters formed as a result of clustering is excluded. According to the present embodiment, a feature vector included in a cluster that satisfies a reference score among clusters formed as a result of the first clustering may be excluded from a clustering step that is repeatedly performed later.

Here, the reference score may be a value determined based on the density of clusters formed as a result of clustering. For example, if the density that can be determined based on the radius of the target cluster and the number of feature vectors included in the target cluster is greater than or equal to the reference value, the feature vectors included in the target cluster may be excluded. Since the feature vectors aggregated with a density greater than or equal to the reference value in the feature space may mean that the feature vector extracted from the image has a common attribute, it may be reasonable to be excluded from the clustering step that is repeatedly performed later.

Also, the reference score may be a value determined based on an attribute of a feature vector included in a cluster formed as a result of clustering. For example, when a variance value of a specific item of feature vectors included in the target cluster is less than or equal to a reference value, the feature vector included in the target cluster may be excluded. Since the variance value of the specific item of the feature vectors is equal to or less than the reference value may mean that the deviation between the items of the feature vector reflecting the features of the image is small, it may be reasonable to be excluded from the clustering step that is repeatedly performed later. In this case, it can be understood as described above that the feature vector included in the target cluster may be excluded based on a combination of a plurality of items as well as a specific item of feature vectors.

Next, in step S400, clustering is re-performed based on the changed clustering parameter for the feature vectors included in the clusters that do not satisfy the reference score among the clusters. According to the present embodiment, the second clustering may be performed for feature vectors belonging to some clusters that do not satisfy a reference score among clusters formed as a result of the first clustering. In this case, the clustering parameter of the second clustering that are re-performed and the clustering parameter of the first clustering may be different from each other.

In some embodiments related to step S400, the clustering parameter may include a resolution of a clustering target image. That is, clustering may be re-performed by changing the resolution of an image for feature vectors included in a cluster that does not satisfy the reference score as a result of the first clustering. According to this embodiment, the second clustering may be performed under conditions different from the first clustering.

In some other embodiments related to step S400, the clustering parameter may include a clustering algorithm. That is, clustering may be re-performed by changing a clustering algorithm applied to the execution of the first clustering for feature vectors included in the cluster that do not satisfy the reference score as a result of the first clustering. According to this embodiment, the second clustering may be performed under conditions different from the first clustering.

The clustering parameter related to step S400 may be determined based on a resolution of a clustering target image for optimization of an objective function value, a cluster radius, and the minimum number of vectors for cluster formation. For example, the resolution of the target image may be a value for determining the resolution of an image to be adjusted for feature vectors included in a cluster that does not satisfy a reference score as a result of clustering. For another example, the cluster radius and the minimum number of vectors for cluster formation may be values for determining a clustering algorithm to be applied to feature vectors included in a cluster that does not satisfy a reference score as a result of clustering. That is, by determining the resolution of the target image for optimization of an objective function value, the cluster radius, and the minimum number of vectors for cluster formation, a clustering parameter for re-performing the clustering on the feature vectors may be determined.

In some other embodiments related to step S400, the optimization of the objective function value may mean determination of a resolution of a clustering target image for minimizing the above-described objective function value, a cluster radius, and a minimum number of vectors for cluster formation. For a more detailed description related to the objective function value, it will be described with reference to the following equation.

$$y_{objective} = w_1 f_{time}(r_k) + w_2 f_{clusterability}(\varepsilon_k, \rho_k) + w_3 f_{clustercount}(\varepsilon_k, \rho_k)$$

In the equation, $y_{objective}$ means the objective function.

Here, $f_{time}$ is a value determined by $r_k$ (resolution of the target image) and indicates a clustering execution speed. In addition, $f_{clusterability}$ is a value indicating clustering performance, and a value including a first value indicating a degree of similarity in the attributes of feature vectors included in each cluster and a second value indicating a degree of difference in the attributes between feature vectors included in other clusters. And, it is a value determined by $\varepsilon_k$ (cluster radius) and $\rho_k$ (minimum number of vectors for cluster formation). In addition $f_{clustercount}$ is a value indicating the number of clusters formed, and is a value determined by $\varepsilon_k$ (cluster radius) and $\rho_k$ (minimum number of vectors for cluster formation).

In addition, k in the equation is a value representing the number of clustering. In addition, $w_1$ to $w_3$ are weight values. The clustering parameters may be changed by determining $r_k$, $\varepsilon_k$ and $\rho_k$ for minimizing the objective function for each iterative execution step of clustering.

The process of determining $r_k$, $\varepsilon_k$ and $\rho_k$ in order to minimize the value of the objective function described above is a process of determining $r_k$, $\varepsilon_k$ and $\rho_k$ having good clustering performance while $f_{clustercount}$ is in a reference range.

In some other embodiments related to this, reinforcement learning, which is a kind of machine learning, may be performed in order to optimize the objective function value. It should be noted that all known techniques for reinforcement learning can be applied to this embodiment.

Next, in step S500, the step of re-performing clustering is repeated until all clusters formed as a result of clustering satisfy the reference score. According to the present embodiment, clustering is repeatedly performed by different clustering parameters for each step of repeatedly performing the clustering, so that clustering for feature vectors having scale heterogeneity characteristics may be performed.

Figure 15:
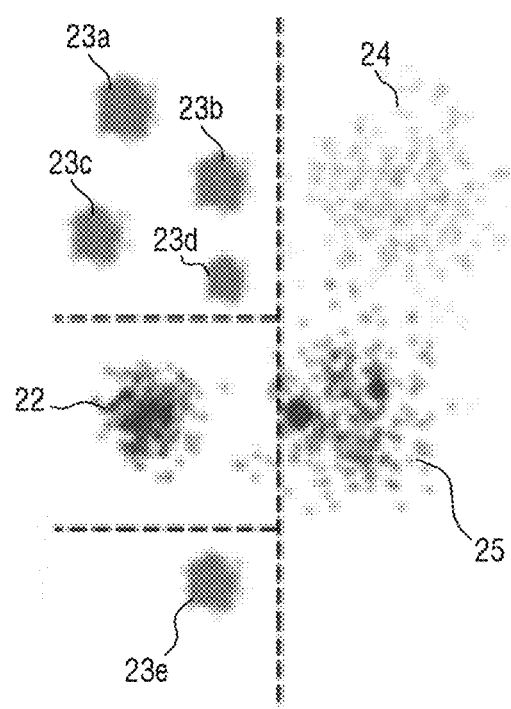
FIGS. 15 to 17 are exemplary diagrams for describing repeatedly performing clustering that may be referred to in some embodiments of the present disclosure.
Figure 16:
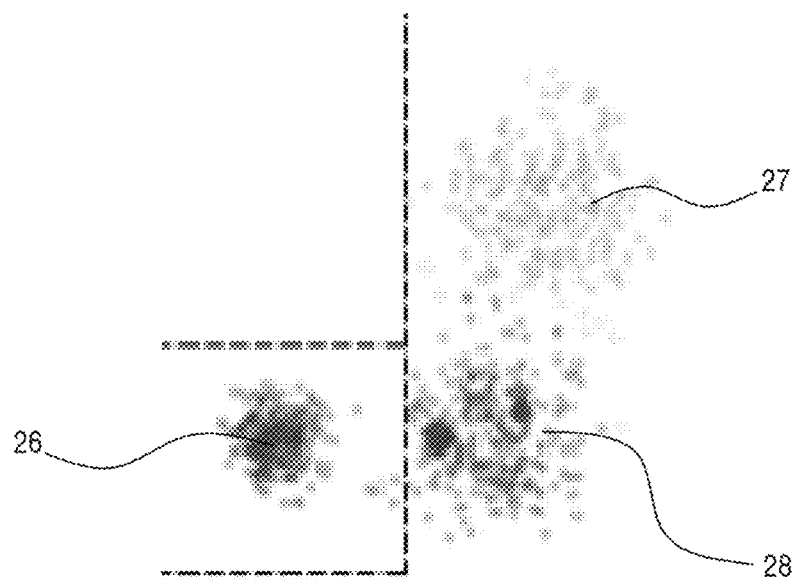
Figure 17:
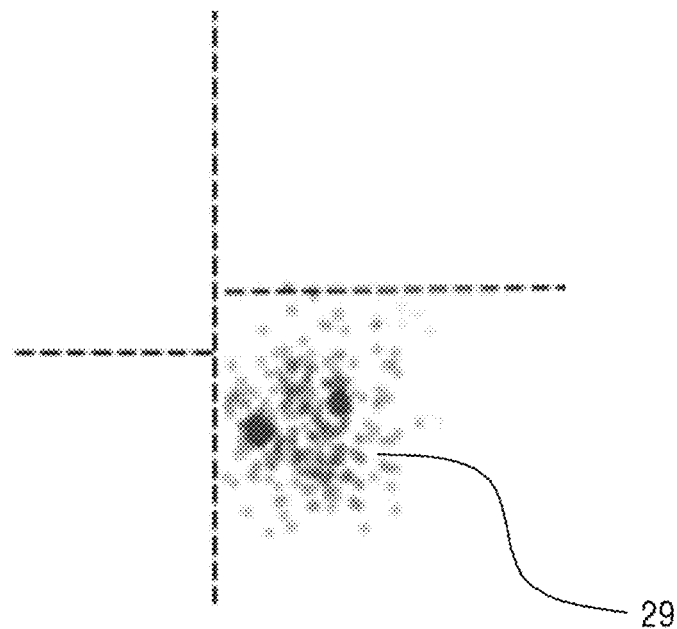

FIGS. 15 to 17 are exemplary diagrams for describing repeatedly performing clustering that may be referred to in some embodiments of the present disclosure. FIG. 15 is an example of a feature space, in which clusters 22, 23a to 23e, 24 and 25 formed as a result of the first clustering are expressed. In FIG. 15, clusters 23a to 23e that satisfy the reference score and clusters 22, 24, and 25 that do not satisfy the reference score can be identified. As described above, the reference score may mean a value determined based on a density of a cluster or an attribute of a feature vector included in the cluster.

FIG. 16 is an example of a feature space excluding clusters 23a to 23e that satisfy a reference score that can be identified in FIG. 15. Referring to FIG. 16, as some clusters are excluded, it can be understood that clusters 26, 27, and 28 that do not satisfy the reference score remain in the feature space.

FIG. 17 is an example of a feature space, in which clusters 29 formed as a result of second clustering are expressed. It can be understood that, as a result of re-performing clustering on feature vectors included in the clusters 26, 27, and 28 that do not satisfy the reference score as described in FIG. 16 by changing the clustering parameter described above, it is clustered with a single cluster that satisfies the reference score in FIG. 17. When all remaining clusters satisfy the reference score as a result of clustering as described above, the step of repeatedly performing clustering may be terminated.

Figure 18:
FIG. 18 is an exemplary diagram for describing a clustering result that can be referred to in some embodiments of the present disclosure.

FIG. 18 is an exemplary diagram for describing a clustering result 20 that can be referred to in some embodiments of the present disclosure. Referring to FIG. 18, it can be seen that the clustering is completed and the representative image 61 of the first cluster and the individual images 61*a* and 61*b* included in the first cluster have the same pattern. In addition, it can be seen that the representative image 63 of the second cluster and the individual image 63*a* included in the second cluster have the same pattern. That is, images belonging to the same cluster have the same pattern, and images belonging to different clusters have different patterns.

FIG. 19 is an exemplary diagram of a user terminal screen 70 described with reference to FIG. 1. In FIG. 19, a simple block diagram of a clustering process, a graph 71 of the number of clusters, a graph 73 of a reference score for each cluster, a script 75 for evaluating clustering, and the attribute value 77 for a plurality of images, on which clustering is performed, are expressed. It should be noted that the example shown in FIG. 19 shows an example of a user terminal screen 70 that can be implemented as some embodiments of the present disclosure are applied, and does not limit the scope of the present disclosure.

So far, an image clustering method according to another embodiment of the present disclosure has been described in detail. Hereinafter, a method of inspecting an abnormal circuit pattern according to another embodiment of the present disclosure will be described with reference to FIG. 5.

Figure 5:
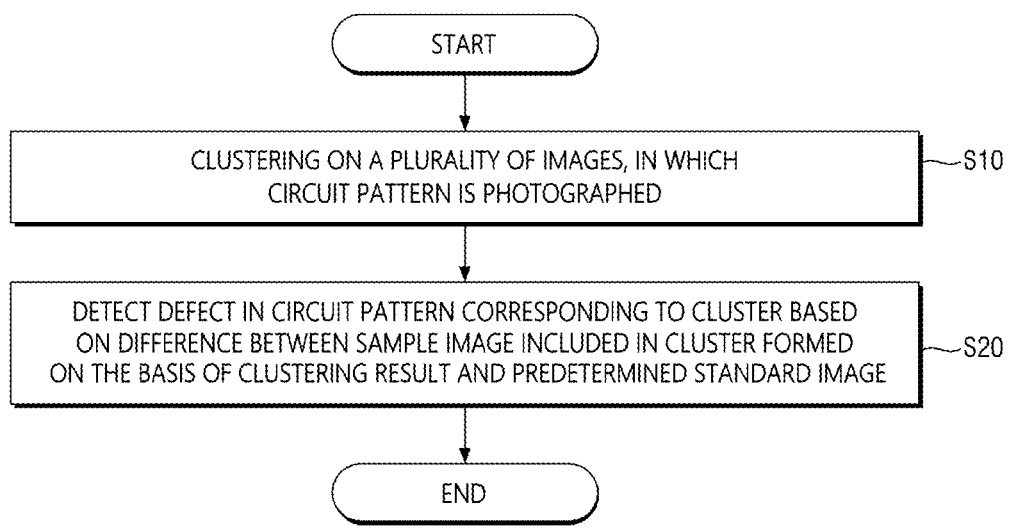
FIG. 5 is an exemplary flowchart illustrating a method of inspecting an abnormal circuit pattern according to another embodiment of the present disclosure.
Figure 6:
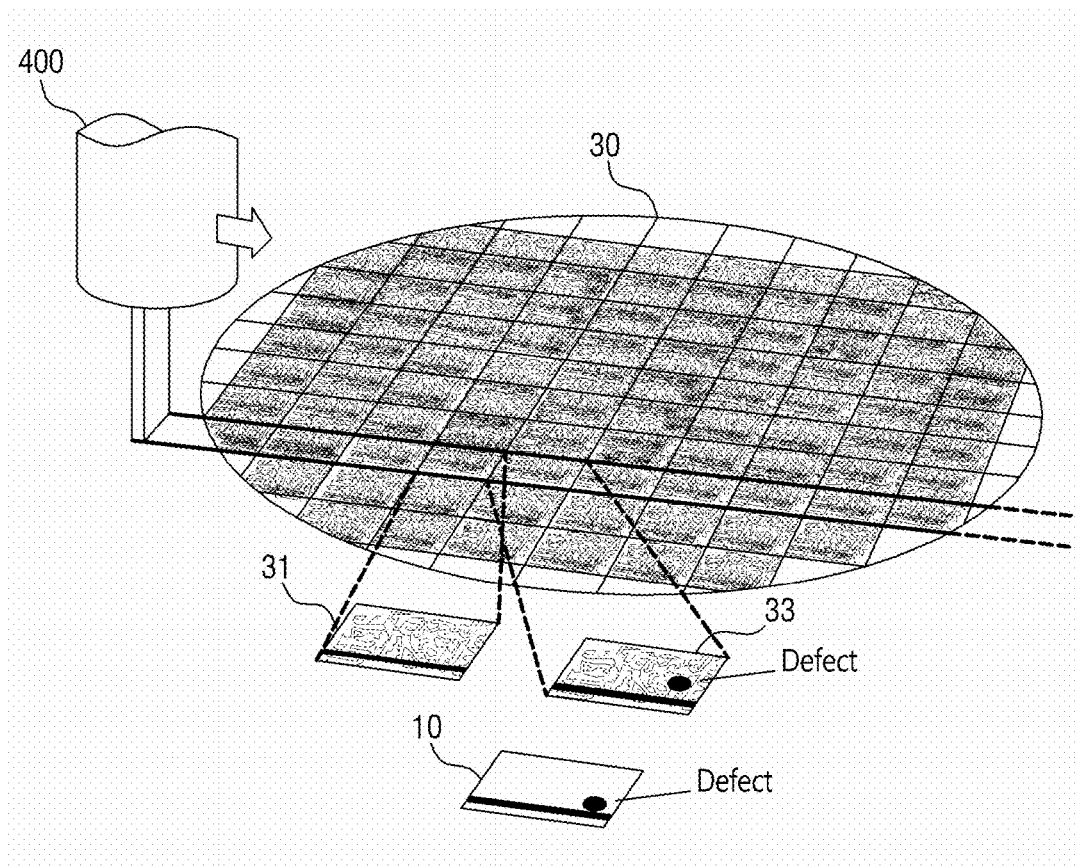
FIG. 6 is a diagram for describing a photo process that may be referred to in some embodiments of the present disclosure.

FIG. 5 is an exemplary flowchart illustrating a method of inspecting an abnormal circuit pattern according to another embodiment of the present disclosure. The flowchart shown in FIG. 5 is only a preferred embodiment for achieving the object of the present disclosure, and some steps may be added or deleted as necessary.

In addition, each step of the methods shown in FIG. 5 may be performed by a computing device. In other words, each step of the methods may be implemented with one or more instructions executed by the processor of the computing device. All steps included in the methods may be performed by one physical computing device, but the first steps of the method may be performed by a first computing device, and the second steps of the method may be performed by a second computing device. In the following, description will be continued on the assumption that each step of the methods is performed by the image clustering apparatus 200 illustrated in FIG. 5. However, for convenience of description, the description of the operation subject of each step included in the methods may be omitted.

Referring to FIG. 5, in step S10, clustering on a plurality of images, in which a circuit pattern is photographed, is performed. In this step, the clustering described above with reference to FIGS. 2 to 4 may be applied.

Next, in step S20, based on the difference between the sample image included in the cluster formed on the basis of the clustering result and the predetermined standard image, a defect in the circuit pattern corresponding to the cluster is detected. Here, the sample image may refer to an image selected at random among images included in a specific cluster, and the standard image may refer to a representative image corresponding to a specific cluster. Since the images included in the cluster have the same pattern according to the above-described step S10, the sample image randomly selected from the cluster and the standard image are compared, so that defects in the circuit pattern for the plurality of images included in the cluster may be inspected. Accordingly, the time for detecting a defect in a circuit pattern can be remarkably shortened.

So far, methods according to some embodiments of the present disclosure have been described with reference to FIGS. 2 to 19. According to the above-described methods, a multidimensional feature vector is extracted, and an image that is difficult to perform clustering according to a single rule can be clustered. In addition, an image that is difficult to perform clustering due to the scale heterogeneity characteristic of a feature space extracted from a plurality of images may be clustered.

In particular, when the above-described methods are applied to clustering of circuit pattern images, defects in circuit patterns formed on a wafer can be detected. Further, as a prerequisite for detecting defects in the circuit pattern, it is possible to cluster circuit pattern images. In this case, the classification speed for the circuit pattern image is improved, so that the wafer inspection step included in the photo process may be shortened. In addition, classification accuracy for the circuit pattern image is improved, and thus the yield of the entire semiconductor process can be improved.

Hereinafter, an exemplary computing device 1500 that can implement an apparatus and a system, according to various embodiments of the present disclosure will be described with reference to FIG. 20.

Figure 20:
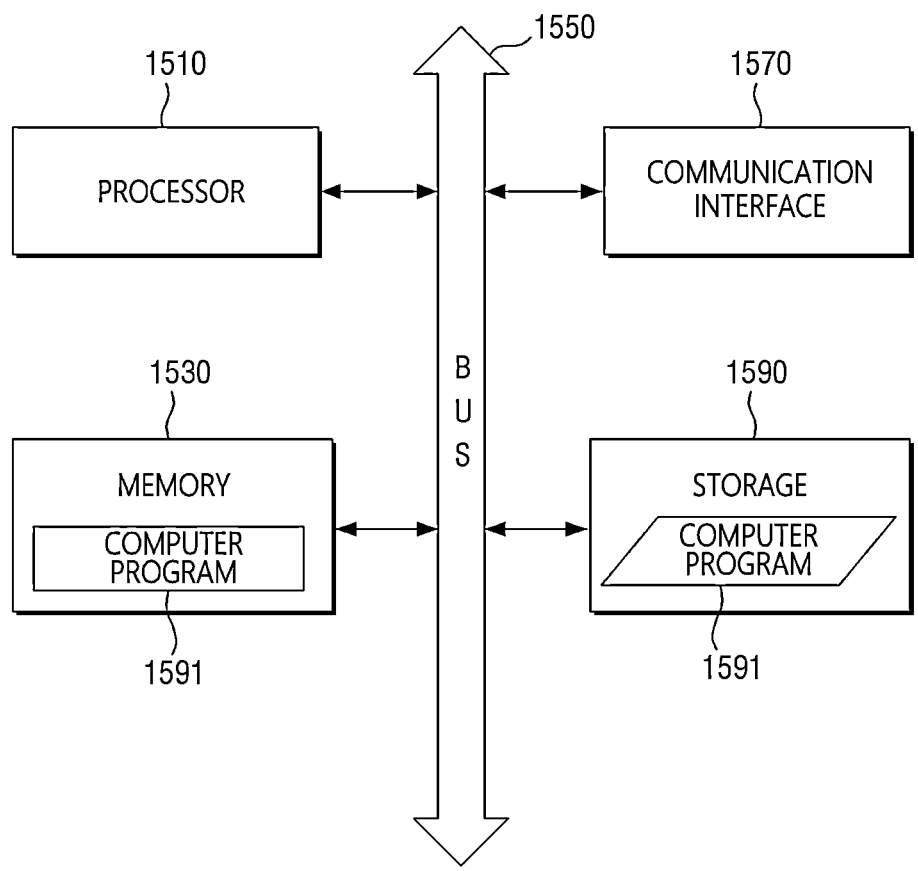
FIG. 20 is an exemplary hardware configuration diagram that can implement an apparatus according to an embodiment of the present disclosure.

FIG. 20 is an example hardware diagram illustrating a computing device 1500.

As shown in FIG. 20, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 20 illustrates only the components related to the embodiment of the present disclosure. Therefore, it will be appreciated by those skilled in the art that the present disclosure may further include other general purpose components in addition to the components shown in FIG. 20.

The processor 1510 controls overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 stores various data, instructions and/or information. The memory 1530 may load one or more programs 1591 from the storage 1590 to execute methods/operations according to various embodiments of the present disclosure. For example, when the computer program 1591 is loaded into the memory 1530, the logic (or the module) as shown in FIG. 2 may be implemented on the memory 1530. An example of the memory 1530 may be a RAM, but is not limited thereto.

The bus 1550 provides communication between components of the computing device 1500. The bus 1550 may be implemented as various types of bus such as an address bus, a data bus and a control bus.

The communication interface 1570 supports wired and wireless internet communication of the computing device 1500. The communication interface 1570 may support various communication methods other than internet communication. To this end, the communication interface 1570 may be configured to comprise a communication module well known in the art of the present disclosure.

The storage 1590 can non-temporarily store one or more computer programs 1591. The storage 1590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as interne and installed in the other computing device, thereby being used in the other computing device.

Although the operations are shown in a specific order in the drawings, those skilled in the art will appreciate that many variations and modifications can be made to the preferred embodiments without substantially departing from the principles of the present inventive concept. Therefore, the disclosed preferred embodiments of the invention are used in a generic and descriptive sense only and not for purposes of limitation. The scope of protection of the present inventive concept should be interpreted by the following claims, and all technical ideas within the scope equivalent thereto should be construed as being included in the scope of the technical idea defined by the present disclosure.

What is claimed is:

1. A method performed by a computing device for clustering a plurality of images, the method comprising:
   converting the plurality of images into feature vectors;
   first-clustering the feature vectors of the plurality of images based on a first clustering parameter; and
   second-clustering feature vectors belonging to at least a part of clusters, which do not satisfy a reference score among clusters formed as a result of the first-clustering, based on a second clustering parameter different from the first clustering parameter,
   wherein at least one of the first clustering parameter or the second clustering parameter is determined by optimizing a value of an objective function while a number of clusters to be formed is in a reference range, the objective function being a function related to a resolution of a clustering target image, a cluster radius, and a minimum number of vectors for cluster formation.

2. The method of claim 1, wherein the plurality of images are circuit pattern images formed on a semiconductor wafer.

3. The method of claim 1, further comprising:
   repeating clustering while changing a clustering parameter until all clusters formed as a result of clustering satisfy the reference score.

4. The method of claim 1, wherein the converting comprises:
   pre-processing a target image among the plurality of images; and
   converting the pre-processed target image into a feature vector.

5. The method of claim 1, wherein at least one of the first clustering parameter or the second clustering parameter includes a clustering algorithm.

6. The method of claim 1, wherein the optimization is performed based on reinforcement learning.

7. The method of claim 1, wherein the reference score is a value determined based on a density of a cluster.

8. The method of claim 1, wherein the reference score is a value determined based on an attribute of a feature vector included in a cluster.

9. The method of claim 2, wherein the converting comprises:
   extracting a first direction component of each of the plurality of images;
   extracting a second direction component perpendicular to a first direction of the first direction component; and
   converting each of the plurality of images into a feature vector based on the extracted first direction component and second direction component.

10. The method of claim 4, wherein the pre-processing comprises removing a transparency of the target image.

11. The method of claim 4, wherein the pre-processing comprises adjusting a resolution of the target image.

12. The method of claim 4, wherein the pre-processing comprises converting a color of the target image to black and white.

13. The method of claim 4, wherein the pre-processing comprises extracting an outline of the target image.

14. The method of claim 4, further comprising:
   reducing a dimension of the feature vectors converted as a result of repeating the pre-processing and the converting the target image until it is complete for the entire plurality of images.

15. The method of claim 14, wherein the reducing comprises simultaneously reducing the dimension of the feature vectors.

16. The method of claim 14, wherein the reducing comprises individually reducing the dimension of each of the feature vectors.

17. An apparatus for clustering a plurality of images, the apparatus comprising:
   a processor;
   a network interface;
   a memory; and
   a computer program loaded into the memory and executed by the processor,
   wherein the computer program comprises,
   an instruction for performing a first clustering on feature vectors of the plurality of images based on a first clustering parameter; and
   an instruction for performing a second clustering for feature vectors belonging to at least a part of clusters, which do not satisfy a reference score among clusters formed as a result of the first clustering, based on a second clustering parameter different from the first clustering parameter, and
   wherein at least one of the first clustering parameter or the second clustering parameter is determined by optimizing a value of an objective function while a number of clusters to be formed is in a reference range, the objective function being a function related to a resolution of a clustering target image, a cluster radius, and a minimum number of vectors for cluster formation.

18. A method performed by a computing device for inspecting an abnormal circuit pattern, the method comprising:

performing clustering on a plurality of images of a circuit pattern, while repeatedly performing clustering based on a different clustering parameter for an image included in a cluster that does not satisfy a reference score until all clusters formed as a result of preforming clustering satisfy the reference score; and detecting a defect in the circuit pattern corresponding to a cluster formed based on the repeatedly performing the clustering based on a difference between a sample image included in the cluster formed based on the repeatedly performing the clustering and a predetermined standard image, wherein, each time the clustering is repeated, the different clustering parameter is determined by optimizing a value of an objective function while a number of clusters to be formed is in a reference range, the objective function being a function related to a resolution of a clustering target image, a cluster radius, and a minimum number of vectors for cluster formation.

* * * * *